United States Patent [19]

Watt et al.

[11] 4,422,301

[45] Dec. 27, 1983

[54] EVAPORATIVE LOSS REDUCTION

[75] Inventors: Robert H. Watt, 3 River Rd., Rivonia, Transvaal, South Africa; Richard H. Ladd, Transvaal, South Africa; Walter S. Wright, deceased, late of Happy Venture, Portion 30, Farm Stryfontein, 4771 R, Dist. Vereeniging, South Africa, by Albert Christiaan Fleischack, administrator

[73] Assignees: Robert H. Watt, Transvaal; William F. Hastie, Umkomaas; Walter Stockdale Wright, Vereeniging, all of South Africa

[21] Appl. No.: 147,688

[22] Filed: May 7, 1980

[51] Int. Cl.³ .............................................. F17C 13/00
[52] U.S. Cl. .......................................... 62/54; 55/88; 55/89; 62/100; 62/268; 220/85 VR
[58] Field of Search ............... 62/54, 100, 268; 55/88, 55/89; 220/85 VR, 85 VS

[56] References Cited

U.S. PATENT DOCUMENTS

| 2,471,559 | 5/1949 | Dolezal | 62/100 |
| 2,621,492 | 12/1952 | Beardsley et al. | 62/100 |
| 3,733,838 | 5/1973 | Delahunty | 62/54 |
| 3,800,550 | 4/1974 | Delahunty | 62/54 |
| 3,947,258 | 3/1976 | Decker | 62/54 |
| 4,010,779 | 3/1977 | Pollock et al. | 62/54 |

FOREIGN PATENT DOCUMENTS 642665 6/1964 South Africa.

Primary Examiner—Ronald C. Capossela
Attorney, Agent, or Firm—Ladas & Parry

[57] ABSTRACT

Process and apparatus for recovery of vapor which is contained with air in a space above a volatile liquid which is stored in a container, especially a petroleum distillate or other costly liquid. The process employs the pressure build up due to thermal effects on the space above the volatile liquid to drive the vapor through a heat exchanging region at which a venturi evaporative cooling unit is used to extract heat from the vapor and partially condense the vapor without significant compression. A part of the condensed vapor is recycled to the heat exchanging region and introduced as a spray for a condensation "seeding" effect. The vapor is further cooled after cooling by the venturi evaporative cooling unit in a second and even a third cooling stage; these stages can include use of a conventional refrigeration unit to chill a heat exchanger and an ultra low temperature can be achieved by expanding liquified gas such as nitrogen in an insulated cyclone to achieve high percentage recovery of the vapor.

8 Claims, 5 Drawing Figures

EVAPORATIVE LOSS REDUCTION

BACKGROUND OF THE INVENTION (a) Field of the Invention

This invention relates to the reduction of losses by evaporation particularly, for example, in regard to evaporative losses in the case of petrol stored in bulk tanks and bulk storage depots but also in relation to the prevention of evaporative losses from any liquids being stored. The invention naturally has particular application in regard to costly liquids which are subject to evaporative losses and a further example in this regard is the storage of pharmaceutical alcohol. Any volatile liquid will be of interest in the context of this invention and further examples are methylene chloride, methyl and ethyl alcohol, acetone and many others.

(b) Description of the Prior Art

In the bulk storage of volatile liquids at ambient temperature and pressure evaporative losses are a natural and unavoidable consequence. It is not economically justifiable to construct bulk storage tanks so as to sustain a sufficient pressure on the stored liquid to prevent evaporative losses nor is it economically justifiable to cool the stored liquid so as to reduce or eliminate evaporative losses by this means. In practice the free space above the stored liquid and under the roof of the tank under continental climatic conditions can reach a temperature considerably higher than the temperature of the body of the liquid itself. Such bulk storage tanks are vented at a small pressure above ambient by means of a safety valve for example set below 14 kPa. Even at this small pressure a substantial evaporative loss can occur especially in continental climatic conditions in which the temperature of the vapour in the tank above the free surface of liquid can rise for example to 60° C. (For example at that temperature, petroleum would have a vapour pressure approaching 90 kPa). As a result vapourised fuel is continuously vented in the case of a bulk fuel storage tank.

SUMMARY OF THE INVENTION

In accordance with this invention the vented vapour is not allowed to escape to atmosphere but is led to a heat exchanger at which heat is extracted from the vapour sufficiently to condense it at or close to atmospheric pressure, the condensed liquid then being returned to the storage tank. It is a feature of this invention that only the very small venting pressure (for example 14 kPa as mentioned above) is used to drive the vapour through the system, the end of the system where the fuel has been liquified being vented to atmosphere so as to maintain atmospheric pressure at that point of the system.

The apparatus of the invention will thus comprise heat exchanger means, which may, for example, be divided into a primary heat exchanger, a secondary heat exchanger, and even a tertiary heat exchanger, conduits for connection from the region above the free liquid level of a liquid storage tank to lead vapours from this region to the heat exchanger means and means for return of the condensed vapour to the liquid body in the tank, or elsewhere, as required, which, for example, can be a very small pump.

Thus in accordance with this invention the preservation of the free venting to atmosphere is assured thus ensuring that the pressure in the bulk storage tank is not increased above the minimal venting pressure which is prescribed for the tank.

The broad principle of this invention is applicable with any heat exchange system, but for the provision of a cooling medium the invention is carried out with the use of a venturi type cooling unit in which air is both cooled and moved through a venturi passage by a high velocity water jet and then the air admixed with mist from the water jet is passed through a heat exchanger. The vapour from the volatile liquid can be directly cooled in the heat exchanger or indirectly cooled by exchanging heat with a chilled water which is chilled in the heat exchanger of the venturi. This type of cooling unit is described in South African Pat. No. 64/2665 which was granted on a Complete Specification lodged pursuant to a Provisional Specification lodged with application No. 64/2665 and cognating provisional specification No. 65/2928 which in turn was divided out to Provisional Specification No. 64/5768, and that description is incorporated herein by reference.

This type of venturi cooling unit has substantial advantages in this application because of its high efficiency and also because it requires only a comparatively small pump to pump water to the jets of the unit. As is described in the patent referred to the unit includes mist eliminaters which remove water mist from the air flow which is vented to atmosphere and which carries away the heat which has been exchanged with the vapour from the storage tank.

The venturi can be used as a primary heat exchanger with, optionally, a secondary (and even a tertiary) heat exchanger added to further cool the vapour from the storage tank, and so increase the recovery of the vapour.

As is known very stringent fire precautions are essential in bulk fuel storage depots and the characteristics of this invention as described above facilitate compliance with the stringent requirements in a financially justifiable installation.

Although the venturi type cooling unit is as mentioned very efficient, for example exhibiting cooling efficiencies up to 90%, a limitation of the unit is that is inherently can only cool to a temperature approaching the prevailing wet bulb temperature; while the wet bulb temperature is quite low in dry regions such, for example, as the U.S. midwest and deserts, it is higher in humid regions such as, for example, the sea coast. Considerations such as these may influence the use of a secondary and, if necessary a tertiary heat exchanger after the venturi type cooling unit. The secondary heat exchanger could for example be a packaged refrigeration unit using a secondary cooling medium such as water so that the refrigeration unit can be installed at a distance remote from the bulk storage tanks in the case of fuel storage tanks where stringent fire precautions apply. A tertiary stage can be provided with use of low temperature liquified gases such, for example, as nitrogen. Preferably the nitrogen is brought into direct contact with the balance of the vapour and any admixed air remaining after the first and second cooling stages, in the form of a spray and the liquified or frozen vapour separated from the air e.g. by vortex separation; in this way total vapour recovery can be approached and may be economically justifiable.

A further important preferred feature employed in the first and optionally also second stages is the seeding of the vapour entering the heat exchanger with a part of the condensed vapour recirculated as a spray.

It will thus be appreciated that the essential steps of the process in accordance with this invention, for recovering a vapour which is contained with air in a space above a volatile liquid which is stored in a container, comprise causing a predetermined pressure above ambient air to be generated in the space, leading the vapour and any admixed air to a region for extraction of heat from the vapour, extracting heat from the vapour sufficiently to condense it partially at least at a pressure related to a downward pressure gradient from the space to the region for extraction of heat, transferring condensed liquid to a store and venting any uncondensed vapour together with any admixed air to ambient air, in which for the extraction of heat from the vapour as a sole, or at least as a first stage, a venturi evaporative cooling process is operated to provide a cooling medium to extract heat from the vapour.

The region for extraction of heat from the vapour can conveniently, and in many embodiments of the invention will, be at a heat exchanger which isolates the vapour from the cooling medium. However, the scope of this invention must in principle be seen as including a system where the vapour is admixed with the cooling medium; for example, the vapour could be introduced into the venturi; however, then the condensed vapour would have to be separated from the cooling medium effectively and economically.

BRIEF DESCRIPTION OF THE DRAWINGS

This invention will be more fully described by way of examples with reference to the accompanying drawings, in which.

DESCRIPTION OF THE PREFERRED EMBODIMENT

Figure 1:
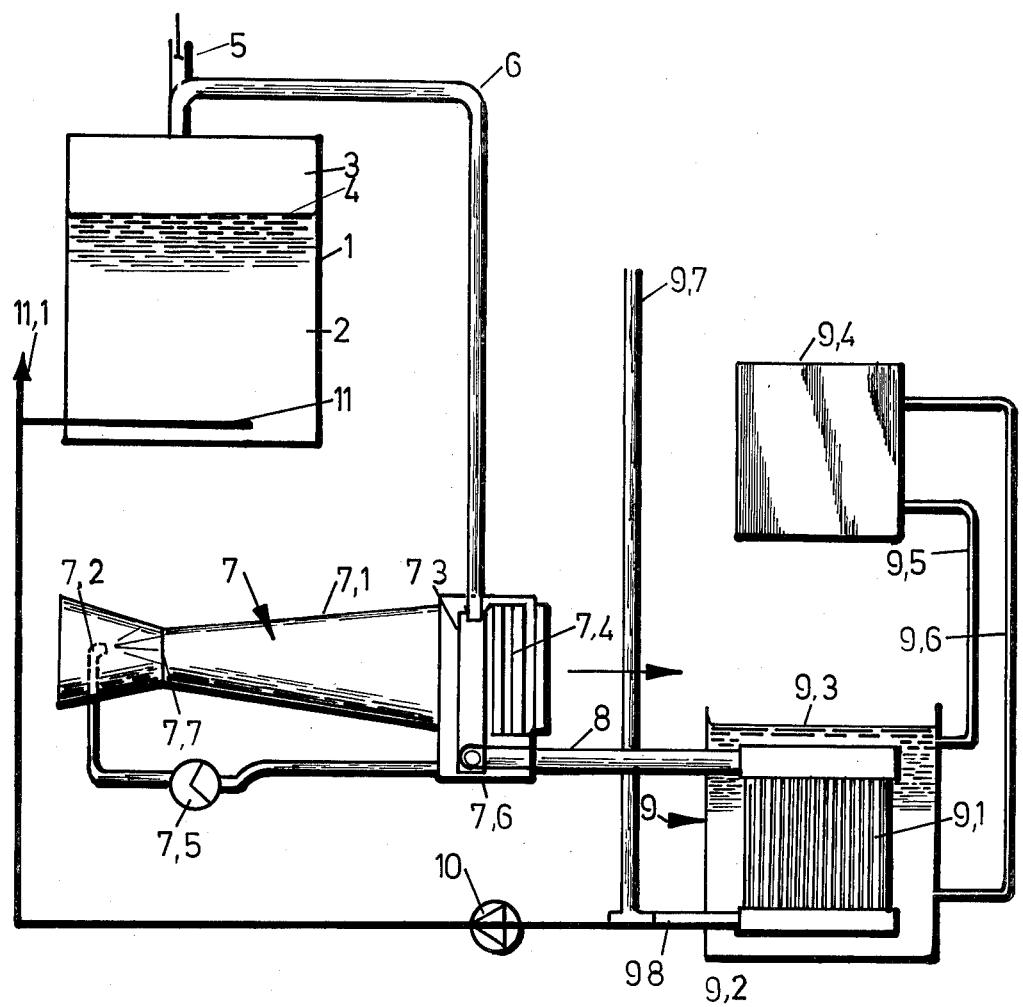
FIG. 1 shows a first system.

FIG. 1 shows a bulk storage tank 1 in which a liquid fuel 2 is stored. The space 3 above the free surface 4 of the liquid fuel contains a mixture of air and fuel vapour. A prescribed vent pipe 5 is installed on the tank set to vent at a pressure no higher than 20 kPa. From a branch in the vent pipe or from a suitable position a pipe 6 is installed in accordance with this invention to lead the vapour to a venturi type cooling unit 7. The unit 7 comprises a venturi tube 7,1 in the mouth of which a water jet 7,2 is installed. A heat exchanger unit 7,3 is installed at the exit of the venturi and, downstream of this, mist eliminater plates 7,4. The pipe 6 leads the vapour into the heat exchanger 7,3 and the vapour and liquid fuel from condensed vapour is led out of the heat exchanger by pipe 8 to a secondary heat exchanger 9 which comprises heat exchanger pipes 9,1 located in a secondary water tank 9,2 in which cooled water 9,3 is circulated from a package refrigerator unit 9,4 via pipes 9,5 and 9,6. A vent pipe 9,7 is provided at the secondary heat exchanger for the venting of uncondensed fuel vapour. A pipe 9,8 is provided for condensed fuel in liquid form and leads to a small pump 10 which returns the condensed liquid via a manifold 11 to the body of liquid in the fuel tank 1, or directs the fuel at 11,1 as required.

As mentioned above, in dry continental climatic conditions for example, the temperature of the vapour 3 in the tank 1 can reach a magnitude of the order of 60° C. Vapour pressures at these temperatures could be far in excess of 20 kPa and the vapour is accordingly continuously vented from the vent 5 with the corresponding loss of fuel. Estimates of the magnitude of this loss are naturally considerably affected not only by prevailing climatic conditions but also by the turnabout time for filling and emptying of the tank and naturally the particular type of fuel being stored, but it is believed that losses of the order of 1,5% are being experienced over a broad front in regard to bulk storage of petrol. Quite apart from national considerations arising from the loss of this valuable fuel and the very substantial monetary figures which it represents, the fuel companies not only have to face the loss of gross income but also in many cases have to pay duty on fuel which has actually been lost because current Government allowances for evaporative losses probably total approximately no more than ½%.

In the embodiment of the invention shown in FIG. 1 the vent pipe 9,7 leads to atmosphere; accordingly, with a pressure maintained by the vent 5 of approximately 20 kPa there is left a pressure differential of approximately 20 kPa available to drive the vapour through the pipe 6, the heat exchanger 7,3 the pipe 8 and the heat exchanger 9,1. At the heat exchangers 7,3 and 9,1 heat is extracted from the vapour and for example in South African Highveld conditions the evaporative cooling unit 7 will reduce the temperature to approximately 17° C. although at coastal conditions with much higher humidity the temperature may only be reduced to about 28° C. In either event the secondary cooling unit may be considered advisable so as to further reduce the temperature of the vapour and accordingly to further reduce its vapour pressure so that the evaporative loss from the ventpipe 9,7 is further reduced. Naturally even if the secondary heat extraction stage 9 were eliminated substantial saving would still be achieved with the venturi type cooling unit by virtue of the reduction of vapour pressure achieved by the reduction of temperature of the fuel vapour which this causes. The fuel which is condensed at the venturi type cooling unit 7 and at the secondary cooling unit 9 passes via the pipe 8 and cooling pipes 9,1 to the exit pipe 9,8 and thence to the pump 10 which pumps this liquid back to the fuel tank 1.

The venturi type cooling unit 7 is valuable in this application not only because of its high cooling efficiency and accordingly economical operation but also because of its low capital cost and its capacity to handle large volumes at vapour at economically justifiable capital costs.

It may be practical and advisable to eliminate the vent pipe 9,7 in which case evaporative loss could be totally eliminated provided suitable controls are introduced to prevent the build up of back pressure in the system. The desirable operation of the system in either event is of course such that the vent 5 is not opened under normal circumstances.

Alternatively the vent pipe 9,7 can be connected to the throat 7,7 of the venturi to achieve significant dilution of the exhaust vapour thereby reducing the content of inflammable vapour to below the explosive or flammable limit. This vapour will be at a low temperature (e.g. near 0° C.) and will therefore contribute to improved efficiency of operation of the venturi. With a tertiary stage, (e.g. as described with reference to FIG. 3) temperatures well below freezing can be attained (e.g. −25° C.).

The venturi type cooling unit 7 employs a pump 7,5 for recycling of water from the sump 7,6 which is supplied by the mist eliminater 7,4 and by make-up water. Since the pumps 7,5 and 10 are small the entire installation can be made to comply with the very stringent fire precaution regulations applicable in bulk fuel storage depots at economically justifiable capital costs.

Figure 2:
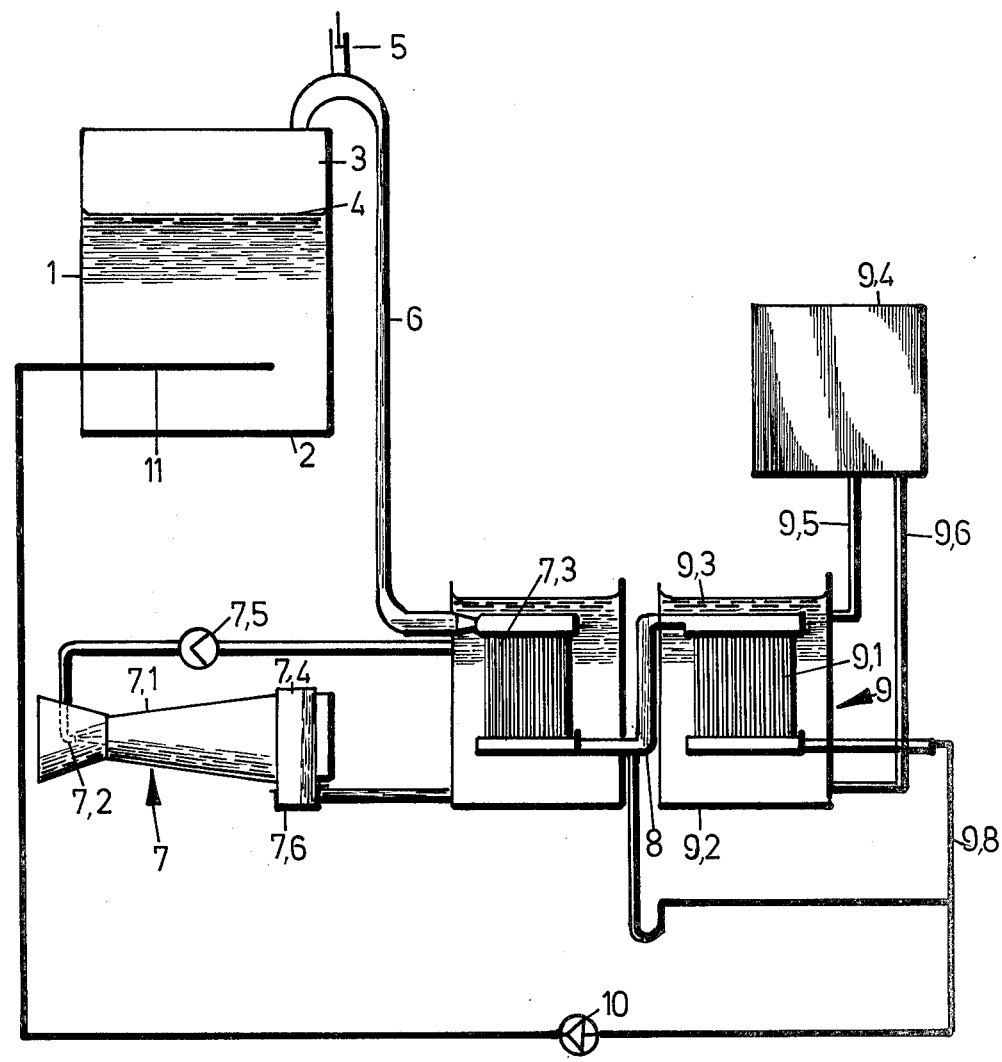
FIG. 2 shows a second system in accordance with this invention. Both of these examples relate to bulk storage tanks for petrol or similar fuels.

FIG. 2 shows an alternative installation which is similar in most respects to that described with reference to FIG. 1 and accordingly the same reference numerals are used for corresponding parts. However, the venturi type cooling unit 7 has been employed in a different way in that the water which is circulated through the venturi type cooling unit is circulated through a primary water tank in which the primary heat exchanger is located and through which the vapour is passed for extraction of heat in a primary stage. The secondary heat exchanger is the same as that described with regard to FIG. 1.

There are clearly different ways of extracting heat from the fuel vapour which is drawn off from the region 3 of the fuel tank in accordance with this invention and accordingly this invention is not restricted to the heat exchanger described but includes in its scope other heat exchangers and heat extraction means. The primary water tank is indicated in FIG. 2 by the numeral 12 and a vent pipe such as the vent pipe 9,7 in FIG. 1 is not shown.

Figure 3:
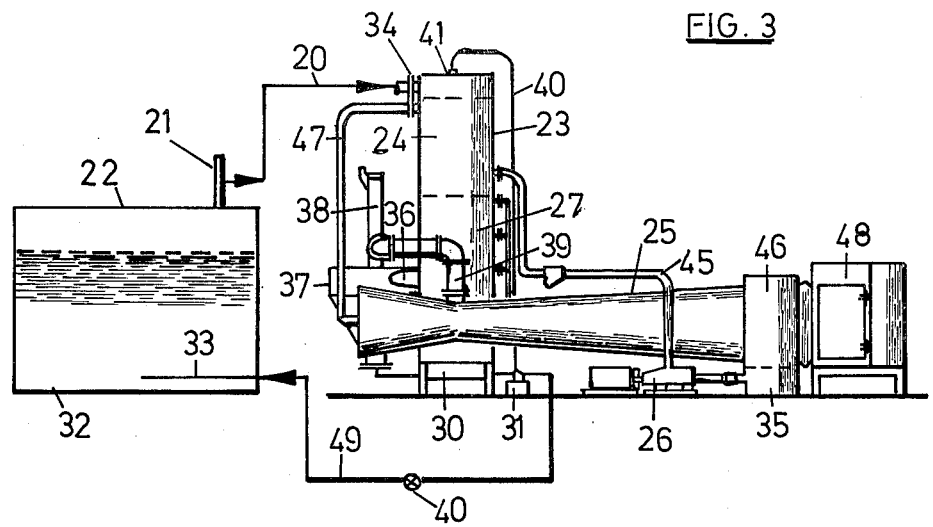
FIG. 3 shows a third, and the currently preferred, system in accordance with this invention, in side elevation.
Figure 4:
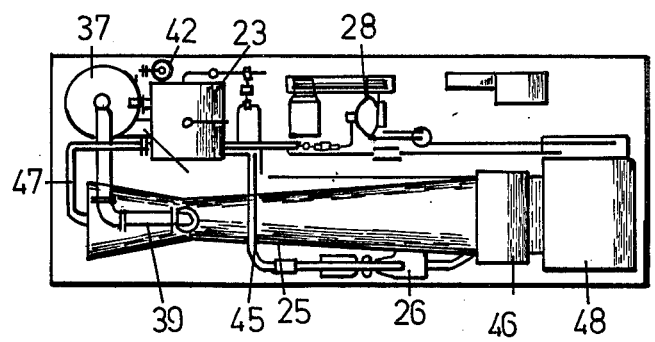
FIG. 4 is a plan view.
Figure 5:
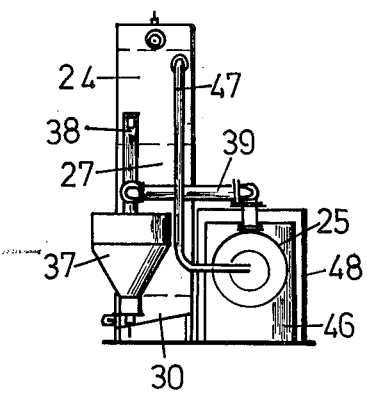
FIG. 5 is an end elevation of this third system.

Referring to FIGS. 3, 4 and 5:-

Vapour is ducted through low pressure ducting 20, (shown schematically), from normal vent connection 21 on the top 22 of a fuel tank 32 (shown schematically) via inlet 34 into cooling chamber 23 of a vapour recovery unit. The cooling chamber 23 contains successive rows of finned heat exchanger tubes, and the cooling chamber is functionally subdivided into two main regions. Primary cooling heat exchanger coils in the region 24 contain chilled water from venturi unit 25 with a moving vapour stream flowing vertically downwards from the inlet 34 over the outer surfaces of the finned tubes. The interior of the cooling chamber is baffled from the side-walls to guide the vapour through the heat exchanger coils. Water is circulated from a sump 35 of the venturi unit 25 through the primary heat exchanger tubes by means of a small pump unit 26. A secondary cooling area is provided with dimensionally similar secondary heat exchanger tubes in the region 27 as evaporative refrigeration units. An externally mounted refrigeration compressor and condenser unit 28 provides Freon refrigeration temperatures in a DX, (direct expansion system), to further reduce the temperature of the downwardly moving vapour stream. The condensed distillate from the chamber 23, will drop to a drip tray 30 of the cooling chamber, be drawn off under ball valve control by a distillate pump 31 and returned via pipe 49, (shown schematically), under pressure to the bottom of the storage tank 32. An internal distribution pipe 33 through the tank side will infuse the distillate back into the parent fuel. Introduction of a liquid meter 40 in the distillate pipe 49 back to the storage tank 32 will provide means of measurement of volumetric return to parent tank. A further pipe 40 from the pump 31 outlet will lead some of the condensed fuel, (a small proportion), to the top of the chamber 23 where it is sprayed into the chamber via a nozzle at 41. This will give a seeding effect to avoid supercooling of the incoming vapour, and thus encourage condensation. Vapour exits from the 2nd stage region 27 via a pipe 36 to a third stage region in a cyclonic tank 37 into which liquid nitrogen from a cylinder 42 is expanded to provide ultra low temperatures. The tank 37 is an insulation lagged stainless steel conical vessel. The nitrogen is introduced in a tangential jet to induce cyclonic flow and the vapour inlet 36 is similarly tangential. The gaseous nitrogen and any air present may vent from the cyclonic tank 27 via pipe 38 but will mainly be drawn into the throat of the venturi via pipe 39 where it will provide further cooling in the venturi. Condensed (or frozen) fuel which is separated by the cyclone action will be returned, via the drip tray 30, also by pump 31 via line 49 to the tank 32. Motive force for movement of the vapour from a vapour area within the storage tank is pressure built-up due to thermal effect. Pressures present in normal storage tanks are normally maintained in the region of 7-10 kPa; this pressure will create flow through the unit. During marginal vapour and temperature conditions, the primary cooling tubes will reduce temperatures sufficiently to condense the majority of vapourous hydrocarbons. With full thermal build-up in tank storage space due to solar effect a thermostatic control will operate the refrigeration system for full cooling and removal of the greater portion of condensibles at these moderate temperatures. The lightest gases present in the vapour stream are those with least mass and lowest condensing points and will be vented to atmosphere or, in a more elaborate system can be drawn off for re-cycling in a refinery. Exteriors of the cooling chamber, venturi and pipe are insulated to exclude heat. Night time inbreathing of atmosphere into the tank introduces water vapour which will initially after start-up be condensed by the apparatus, but this can be separated from the fuel condensate by techniques already employed in the fuel storage art. Heat exchange unit 48 at the terminal part of the venturi unit 25 provides for cooling of the Freon in the refrigeration unit 28.

We claim:

1. A process for recovering a vapour contained with air in a space above a volatile liquid stored in a container comprising causing a predetermined pressure above ambient air to be generated in the space, leading the vapour and any admixed air to a region for extraction of heat from the vapour, extracting heat from the vapour sufficiently to condense it at least partially at a pressure which is less than the pressure in the region for extraction of heat, transferring condensed liquid to a store and venting any uncondensed vapour together with any admixed air to ambient air, in which for the extraction of heat from the vapour at least as a first stage, a venturi evaporative cooling process is operated to provide a cooling medium to extract heat from the vapour.

2. A process as claimed in claim 1, in which the vapour is moved from the space above the volatile liquid to the region in which heat is extracted with operation of the venturi evaporative cooler by pressure generated in the space above the volatile liquid and in which uncondensed vapour is led to the venturi and is added to the air being moved through the venturi.

3. A process as claimed in claim 1, in which a part of the condensed vapour is recycled to the region for extraction of heat and introduced to this region in the form of a spray in admixture with the incoming vapour, adapted to encourage condensation of the vapour when the vapour is cooled.

4. A process as claimed in claim 1, in which the venturi evaporative cooling process is operated as a primary cooling stage for cooling the vapour and a further cooling stage is operated for cooling the vapour further, which further stage comprises the expansion of a liquified gas in a jet in contact with the vapour so as to reduce the vapour to ultra-low temperatures, directing the jet so as to cause a cyclonic flow of the expanded gas and vapour to separate liquified vapour from the gas.

5. An apparatus for recovering a vapour contained with air in a space above a volatile liquid stored in a container comprising a venturi tube, a water nozzle located at the throat of the venturi tube, a mist eliminator located at the exit of the venturi tube, a sump below the mist eliminator, a heat exchanger unit, ducting connecting the space above the volatile liquid with the heat exchanger, cooling water pipes, cooled air ducting or a combination thereof leading from the exit of the venturi tube to the heat exchanger for cooling the heat exchanger, pipes connecting the heat exchanger to the container for volatile liquid, connected to lead condensed vapour back to the container and ducting leading away from the heat exchanger, connected to lead uncondensed vapour and any admixed air away from the heat exchanger.

6. An apparatus as claimed in claim 5, which comprises piping connecting condensed vapour via a pump to a nozzle at the heat exchanger adapted to direct a spray of condensed vapour into incoming vapour in the heat exchanger.

7. An apparatus as claimed in claim 5, which comprises an insulated cyclonic tank provided with a nozzle for connection with a cylinder of liquified gas, the nozzle directed tangentially into the cyclonic tank, the tank having a tangentially directed inlet duct for vapour and any admixed air, an axially located outlet duct for any uncondensed vapour and admixed air and an outlet pipe for condensed vapour to be led back to the container.

8. An apparatus as claimed in claim 5, in which the outlet duct for any uncondensed vapour and admixed air is led to the throat of the venturi tube for introduction of the vapour and air to the venturi.

* * * * *